(12) United States Patent
Curran

(10) Patent No.: US 9,633,798 B2
(45) Date of Patent: Apr. 25, 2017

(54) ATOMIC CAPACITOR

(71) Applicant: Atlantis Technologies, Dana Point, CA (US)

(72) Inventor: Patrick Michael Curran, Laguna Niguel, CA (US)

(73) Assignee: Atlantis Technologies, Dana Point, CA (US)

( * ) Notice: Subject to any disclaimer, the term of this patent is extended or adjusted under 35 U.S.C. 154(b) by 0 days.

(21) Appl. No.: 14/120,497

(22) Filed: May 27, 2014

(65) Prior Publication Data

US 2016/0042880 A1 Feb. 11, 2016
US 2017/0032900 A9 Feb. 2, 2017

Related U.S. Application Data

(60) Provisional application No. 61/855,769, filed on May 24, 2013.

(51) Int. Cl.

| | |
|---|---|
| *H01G 11/62* | (2013.01) |
| *H01G 11/52* | (2013.01) |
| *H01G 11/04* | (2013.01) |
| *H01G 11/26* | (2013.01) |
| *H01G 11/28* | (2013.01) |

(52) U.S. Cl.
CPC ............ *H01G 11/62* (2013.01); *H01G 11/04* (2013.01); *H01G 11/26* (2013.01); *H01G 11/28* (2013.01); *H01G 11/52* (2013.01); *Y02E 60/13* (2013.01)

(58) Field of Classification Search
None
See application file for complete search history.

(56) References Cited

U.S. PATENT DOCUMENTS

| | | |
|---|---|---|
| 5,192,432 A | 3/1993 | Andelman |
| 5,196,115 A | 3/1993 | Andelman |
| 5,415,768 A | 5/1995 | Andelman |
| 5,425,858 A | 6/1995 | Farmer |
| 5,538,611 A | 7/1996 | Otowa |
| 5,620,597 A | 4/1997 | Andelman |
| 5,748,437 A | 5/1998 | Andelman |
| 5,779,891 A | 7/1998 | Andelman |
| 5,954,937 A | 9/1999 | Farmer |
| 6,309,532 B1 | 10/2001 | Tran et al. |
| 6,346,187 B1 | 2/2002 | Tran et al. |
| 6,413,409 B1 | 7/2002 | Otowa et al. |
| 6,628,505 B1 | 9/2003 | Andelman |
| 6,761,809 B2 | 7/2004 | Tran et al. |
| 7,368,191 B2 | 5/2008 | Andelman et al. |

(Continued)

OTHER PUBLICATIONS

Kuran et al., "Flow Through Capacitor Technology", The International Workshop on Marine Pollution and the Impact of Seawater Desalination Plants on the Coastal Environment, Dubai, UAE, Dec. 1-3, 2003, pp. 1-15.

*Primary Examiner* — Dion R Ferguson
(74) *Attorney, Agent, or Firm* — Wolf, Greenfield & Sacks, P.C.

(57) ABSTRACT

This invention describes a capacitor that formed by a charge or species specific membrane material filled with aqueous or non-aqueous liquid with soluble salts dissolved and non-dissolved in solution and contained within the membrane material. When charged, the oppositely charged ion will leave the structure, leaving behind a charged atomic capacitor.

15 Claims, 7 Drawing Sheets

(56) References Cited

U.S. PATENT DOCUMENTS

Figure 1:
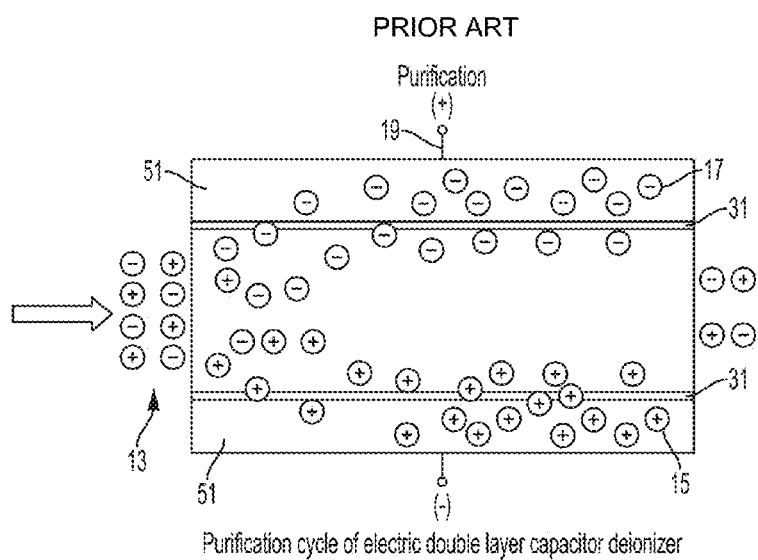

| | | | |
|---|---|---|---|
| 9,193,612 B2 | 11/2015 | Curran | |
| 2003/0161781 A1* | 8/2003 | Cabasso | B01D 53/02 |
| | | | 423/445 R |
| 2004/0076885 A1* | 4/2004 | Sato | H01M 10/052 |
| | | | 429/303 |
| 2005/0103634 A1 | 5/2005 | Andelman et al. | |
| 2006/0049105 A1 | 3/2006 | Max | |
| 2007/0053141 A1 | 3/2007 | Fujino | |
| 2007/0158185 A1 | 7/2007 | Andelman et al. | |
| 2008/0078673 A1 | 4/2008 | Elson et al. | |
| 2009/0218227 A1 | 9/2009 | Noh et al. | |
| 2010/0102009 A1 | 4/2010 | Silva | |
| 2010/0216023 A1* | 8/2010 | Wei | H01G 9/058 |
| | | | 429/220 |
| 2014/0346046 A1 | 11/2014 | Andelman | |
| 2016/0096751 A1 | 4/2016 | Curran | |

* cited by examiner

Atomic capacitor spheres filled with salt in aqueous or non-aqueous or solution

Charge specific membrane material with voids filled with salt in aqueous or non-aqueous or solution Carbon electrode material containing hollow spheres filled with salt in aqueous or non-aqueous or solution Integrated carbon electrode and charge specific membrane material with voids filled with salt in aqueous or non-aqueous solution and carbon

|  |  | MW | 20c solubility gm/100 gm | 20c molarity mol/lit | Charge per mole | Adjusted charge molarity | Adjusted Capacitance F/cc |
|---|---|---|---|---|---|---|---|
| ZnCl2 | Zinc Chloride | 136.4 | 432 | 31.67 | 2 | 63.3 | 6,111 |
| ZnBr2 | Zinc Bromide | 225.2 | 446 | 19.80 | 2 | 39.6 | 3,821 |
| KHCO2 | Potassium formate | 83.1 | 337 | 40.55 | 1 | 40.6 | 3,912 |
| RbHCO2 | Rubidium formate | 129.5 | 554 | 42.78 | 1 | 42.8 | 4,127 |
| LiClO3 | Lithium chloride | 90.4 | 372 | 41.15 | 1 | 41.2 | 3,970 |
| InBr3 | Indium bromide | 354.5 | 571 | 16.11 | 3 | 48.3 | 4,662 |
| InCl3 | Indium chloride | 221.3 | 212 | 9.58 | 3 | 28.7 | 2,773 |
| CsHCO2 | Cesium formate | 176.9 | 450 | 25.44 | 1 | 25.4 | 2,454 |
| SbF3 | Antimony trifluoride | 178.8 | 444 | 24.83 | 3 | 74.5 | 7,187 |
| SbCl3 | Antimony trichloride | 228.3 | 910 | 39.86 | 3 | 119.6 | 11,536 |
| NH3 | Ammonia | 17 | 702 | 412.94 | 3 | 1238.8 | 119,515 |
| NaCl | Sodium Chloride | 58.5 | 35.9 | 6.136752 | 1 | 6.1 | 592 |

Capacitance estimates for various metal hydride salts in aqueous solutions

FIG. 7

ATOMIC CAPACITOR

CROSS-REFERENCE TO RELATED APPLICATIONS

This application claims the benefit of provisional patent application Ser. No. 61/855,769 filed 2013 May 24 by the present inventor.

FEDERALLY SPONSORED RESEARCH

Not applicable

SEQUENCE LISTING OR PROGRAM

Not applicable

BACKGROUND OF INVENTION

Field of Invention

This invention relates to a specially designed capacitor and or capacitor/membrane combination for use in electrochemical devices such as but not limited to capacitive or radial deionization whereby the majority of the capacitance of the system is derived from isolated ions within the charge specific membrane spheres or material.

Objects and Advantages

Accordingly, several objects and advantages of our invention are:
 a) The atomic capacitor can reach a capacitance density of up to 5,000 F/cc or greater which is up to 50 times or greater than state of the art materials.
 b) The atomic capacitor material can be structured so as to be an integrated electrode/membrane monolith.

SUMMARY

This invention describes a capacitor that is made up of a charge specific membrane material with highly soluble salts dissolved and non-dissolved in solution and surrounded by the charge specific membrane material. Each atomic capacitor containing the ion charged material consists of a porous anionic membrane material with a high concentration of aqueous or non-aqueous solution saturated with high solubility salts and a porous cationic membrane also filled with saturated aqueous or non-aqueous solution. When each is charged, the oppositely charged ion will leave its respective membrane, leaving behind a charged atomic capacitor, ready to reabsorb ions of interest in application.

DRAWINGS—FIGURES

Figure 2:
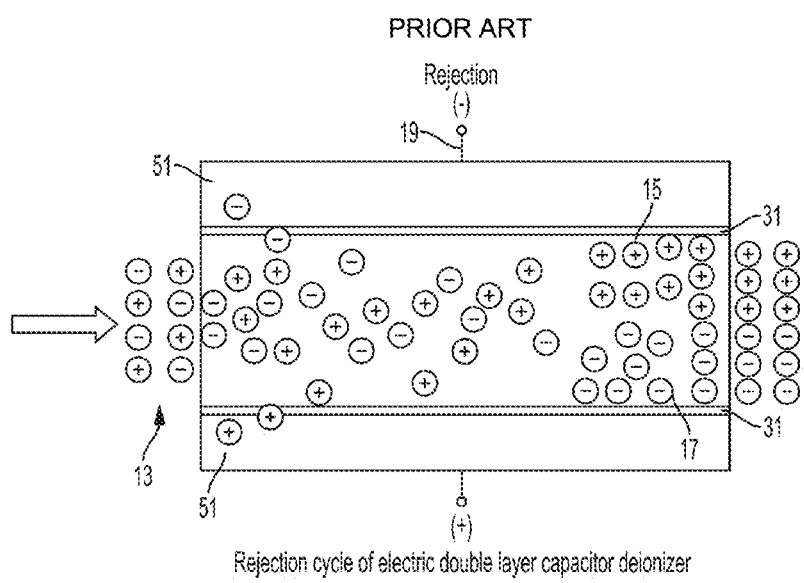
Figure 3:
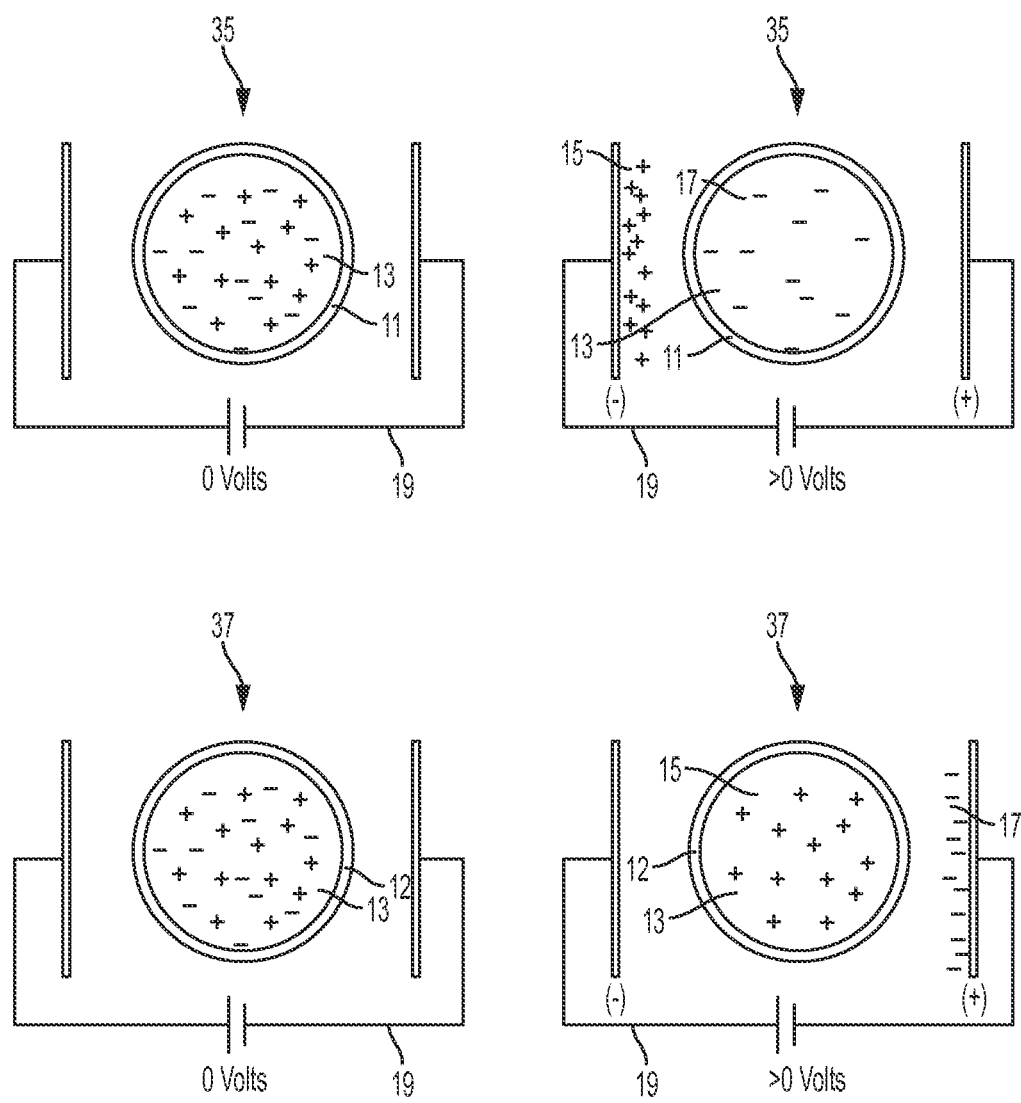
Figure 4:
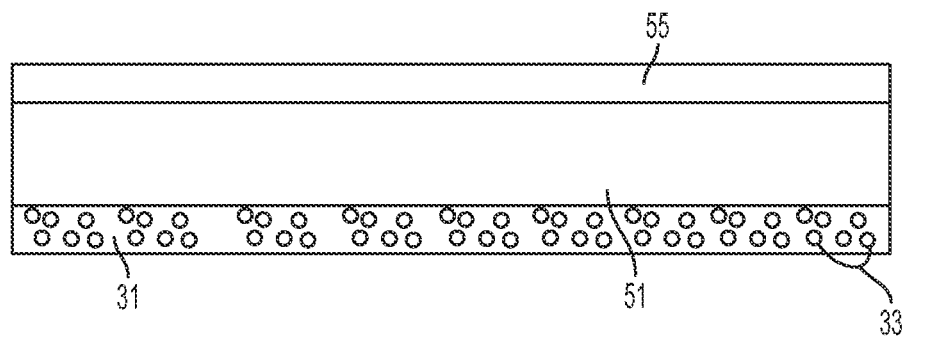
Figure 5:
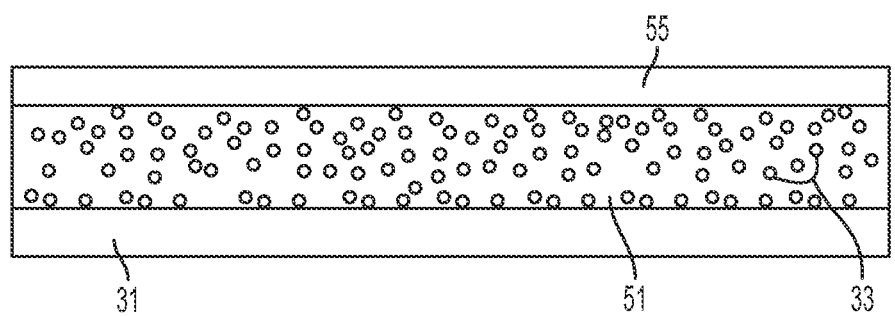
Figure 6:
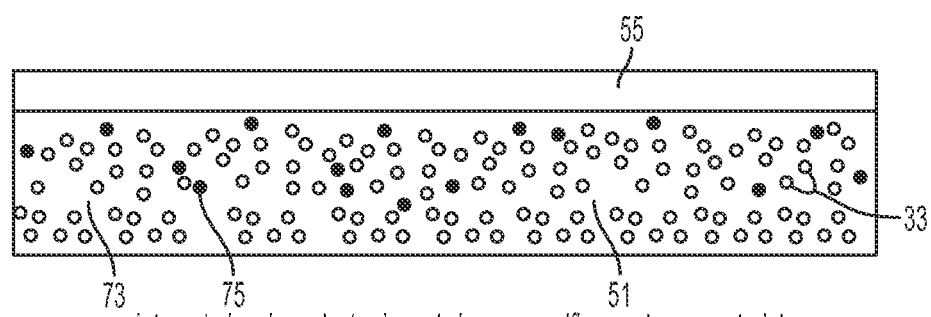

FIG. 1: Purification cycle of electric double layer capacitor deionizer.
FIG. 2: Rejection cycle of electric double layer capacitor deionizer.
FIG. 3: Atomic capacitor spheres filled with salt in aqueous or non-aqueous or solution.
FIG. 4: Charge specific membrane material with voids filled with salt in aqueous or non-aqueous solution.
FIG. 5: Carbon electrode material containing hollow spheres filled with salt in aqueous or non-aqueous or solution.
FIG. 6: Integrated carbon electrode and charge specific membrane material with voids filled with salt in aqueous or non-aqueous solution and carbon.
FIG. 7: Table of highly soluble aqueous salts and estimated capacitance.

DRAWINGS—REFERENCE NUMERALS

11—Cationic membrane sphere shell
12—Anionic membrane sphere shell
13—solution with dissolved and non-dissolved salt.
15—cations
17—anions
19—electric field generator
31—charge specific membrane material
33—capacitor spheres
35—cationic spheres
37—anionic spheres
51—carbon electrode
55—current collector
71—capacitor
73—Mixed carbon electrode, membrane, and capacitor spheres in one layer
75—Super capacitor carbon

DETAILED DESCRIPTION OF THE INVENTION

In an electric double layer capacitor system such as but not limited to the concentric capacitive deionization Radial Deionization device from Atlantis Technologies, two oppositely charged capacitors are separated by a dielectric flow channel and two charge specific membranes. In the purification mode, cations are attracted to the negatively charged carbon electrode and anions are attracted to the positively charged carbon electrode. Each type of ion passes through a membrane whose charge affinity is the same as the ion (positive or negative). After it passes through, it adsorbs onto the surface of the carbon particles that make up the carbon electrode. See FIG. 1.

Once the purification cycle is complete or the carbon electrodes are full of their respective ions, the polarity of the electric double layer capacitor is switched and the ions are pushed away from the carbon, through the membrane, into the spacer and up against the opposite side membrane. Because the membranes are charge specific, these rejected ions cannot pass through and adsorb onto the other carbon electrode and flush out of the system. See FIG. 2.

This invention proposes the partial or complete replacement of the carbon electrodes and charge specific membrane with charge specific membrane material that contains aqueous or non-aqueous solution that is saturated with high solubility salts such as but not limited to sodium chloride, antimony trichloride, ammonia, antimony trifluoride, zinc chloride, zinc bromide, indium bromide, or any other high solubility salt that dissolved and non-dissolved in aqueous or non-aqueous solution.

When the atomic capacitor material is initially made, the cations and anions from the highly soluble salt are in solution and the solution is contained within the charge specific membrane material 11 or 12, as shown in FIG. 3, which shows atomic capacitor spheres filled with salt in aqueous or non-aqueous or solution. The membrane material could be a porous layer of material with a multitude of holes for the aqueous or non-aqueous solution to reside 31, as shown in FIG. 4, which shows charge specific membrane material with voids filled with salt in aqueous or non-aqueous solution. This combination could also be in the form of hollow spheres containing the salt laden liquid 33, as shown in FIG. 5, which shows carbon electrode material containing hollow spheres filled with salt in aqueous or non-aqueous or solution, or FIG. 6, which shows an integrated carbon electrode and charge specific membrane material with voids filled with salt in aqueous or non-aqueous solution. In either case, it is important that the outside of the material be sealed and that there is no significant pathway for the liquid to leave the interior of the membrane sponge or sphere.

An electric double layer capacitor is formed with one of the charge specific membrane compositions constituting one electrode, and the opposite polarity membrane composition constituting the other as described in the attached drawing as optional. When an initial activation charge is applied to the device in the same orientation as the charge specific membranes (anionic side is charged negative, cationic side charged positive), the anions travel out of the anionic and move into the dielectric spacer towards the positively charged electrode. The cations leave the cationic and travel towards the anionic side. This polarity orientation is same as the "reject cycle".

By the end of this initial activation charging cycle, most or all of the anions 17 and cations 15 have left the anionic and cationic spheres or pockets respectively and are residing in the dielectric spacer. With the polarity intact, the ejected ions are flushed out of the system by a liquid flowing through the flow channel/dielectric spacer.

After this initial charging cycle, each sphere is now charged to the opposite polarity due to the inability of the trapped ions to leave the sphere or pocket and is now ready to operate on a continuous basis. To operate, the polarity is switched to the "clean cycle" and the previously ejected ion type (anionic or cationic) is reabsorbed by the sphere from the solution flowing through the dielectric spacer flow channel.

The size, shape, and composition of the atomic capacitors can vary. Capacitor can be a stand-alone structure containing a membrane shell filled with aqueous or non-aqueous liquid containing dissolved and undissolved salts (capacitor mixture), as shown in FIG. 6. It can also be a void within a membrane structure which is also filled with capacitor mixture, as shown in FIG. 4. The shape can range from spherical to any shape that would hold volume. The total volume of the capacitor can be as small as the size of a one salt molecule with minimum liquid up to many milliliters. The wall thickness of a stand-alone structure could be the minimum to contain the liquid such as the length of a membrane molecule, a single layer of graphene or other high strength material.

EXAMPLE 1

An electrode/membrane combination consisting of a porous charge specific membrane material that is filled with a highly soluble salts such as but not limited to metal halides such as sodium chloride, antimony trichloride, ammonia, antimony trifluoride, zinc chloride, zinc bromide, indium bromide, or any other high solubility salt that dissolved and non-dissolved in aqueous or non-aqueous solution.

EXAMPLE 2

Charge specific membrane hollow spheres consisting of charge specific membrane material that is filled with a highly soluble salt such as but not limited to sodium chloride, antimony trichloride, ammonia, antimony trifluoride, zinc chloride, zinc bromide, indium bromide, or any other high solubility salt that dissolved and non-dissolved in aqueous or non-aqueous or solution. These spheres can be incorporated into materials used within an electrochemical device such as capacitive deionization systems.

EXAMPLE 3

An electrode/membrane combination consisting of a porous charge specific membrane material that is filled with a highly soluble salt such as but not limited to sodium chloride, antimony trichloride, ammonia, antimony trifluoride, zinc chloride, zinc bromide, indium bromide, or any other high solubility salt that dissolved and non-dissolved in aqueous or non-aqueous solution in combination with traditional capacitance materials such as but not limited to carbon black, activated carbon, and PTFE fibrillating materials.

EXAMPLE 4

Charge specific membrane hollow spheres consisting of charge specific membrane material that is filled with a highly soluble salt such as but not limited to sodium chloride, antimony trichloride, ammonia, antimony trifluoride, zinc chloride, zinc bromide, indium bromide, or any other high solubility salt that dissolved and non-dissolved in aqueous or non-aqueous solution. These spheres can be adhered in some fashion to the current collector with conductive adhesive and act as both the capacitor material and charge specific membrane.

The invention claimed is:

1. A capacitive deionization device, comprising:
a first electrode;
a second electrode;
a dielectric spacer flow channel positioned between the first electrode and the second electrode;
a first salt solution;
a positive charge specific membrane material proximate the first electrode and forming a positive ion selective barrier between the first salt solution and the dielectric spacer flow channel;
a second salt solution; and
a negative charge specific membrane material proximate the second electrode and forming a negative ion selective barrier between the second salt solution and the dielectric spacer flow channel,
wherein at least one of the first electrode and the positive charge specific membrane material comprises a first plurality of closed voids containing the first salt solution, and wherein at least one of the second electrode and the negative charge specific membrane matter comprises a second plurality of closed voids containing the second salt solution.

2. The capacitive deionization device of claim 1, wherein the positive charge specific membrane material comprises a first membrane layer between the first electrode and the dielectric spacer flow channel, the first membrane layer comprising the first plurality of closed voids.

3. The capacitive deionization device of claim 2, wherein the negative charge specific membrane material comprises a second membrane layer positioned between the second electrode and the dielectric spacer flow channel, the second membrane layer comprising the second plurality of closed voids.

4. The capacitive deionization device of claim 1, wherein the first electrode comprises the first plurality of closed voids.

5. The capacitive deionization device of claim 4, wherein the positive charge specific membrane material comprises a first membrane layer positioned between the first electrode and the dielectric spacer flow channel.

6. The capacitive deionization device of claim 4, wherein the positive charge specific membrane material encapsulates the first salt solution in the first plurality of closed voids.

7. The capacitive deionization device of claim 4, wherein the second electrode comprises the second plurality of voids.

8. The capacitive deionization device of claim 7, wherein the negative charge specific membrane material forms a second membrane layer positioned between the second electrode and the dielectric spacer flow channel.

9. The capacitive deionization device of claim 7, wherein the negative charge specific membrane material encapsulates the second salt solution in the second plurality of voids.

10. The capacitive deionization device of claim 1, wherein the first salt solution comprises a salt species selected from the group consisting of sodium chloride, antimony trichloride, ammonia, antimony trifluoride, zinc chloride, zinc bromide, and indium bromide.

11. The capacitive deionization device of claim 1, wherein each of the first salt solution and the second salt solution comprises a salt species selected from the group consisting of sodium chloride, antimony trichloride, ammonia, antimony trifluoride, zinc chloride, zinc bromide, and indium bromide.

12. The capacitive deionization device of claim 1, wherein each of the first salt solution and the second salt solution has a capacitance density of 5,0000 F/cc or greater.

13. The capacitive deionization device of claim 1, wherein each of the first salt solution and the second salt solution is saturated.

14. A capacitive deionization device, comprising:
a first electrode;
a positive charge specific membrane material comprising a first plurality of voids, the first charge specific membrane material positioned proximate the first electrode;
a first salt solution residing in the first plurality of voids;
a dielectric spacer flow channel positioned proximate the first charge specific membrane material;
a negative charge specific membrane material comprising a second plurality of voids, the negative charge specific membrane material positioned proximate the dielectric spacer flow channel opposite to the negative charge specific membrane material;
a second salt solution residing in the second plurality of voids; and
a second electrode positioned proximate to the second charge specific membrane material opposite to the dielectric spacer flow channel.

15. A capacitive deionization device, comprising:
a first electrode comprising a first plurality of voids;
a first salt solution residing in the first plurality of voids;
a positive charge specific membrane material encapsulating the first salt solution in the first plurality of voids;
a second electrode comprising a second plurality of voids;
a second salt solution residing in the second plurality of voids;
a negative charge specific membrane material encapsulating the second salt solution in the second plurality of voids; and
a dielectric spacer flow channel positioned between the first electrode and the second electrode.

* * * * *